United States Patent
Behmann et al.

(10) Patent No.: US 6,616,843 B1
(45) Date of Patent: Sep. 9, 2003

(54) SUBMERGED MEMBRANE BIOREACTOR FOR TREATMENT OF NITROGEN CONTAINING WATER

(75) Inventors: Henry Behmann, Puslinch (CA); Hidayat Husain, Brampton (CA); Herve Buisson, Maisons-Laffite (FR); Michele Payraudeau, Eaubonne (FR)

(73) Assignees: Omnium de Traitement et de Valorisation, Saint-Maurice Cecex (FR); Zenon Environmental Inc., Oakville (CA)

(*) Notice: Subject to any disclaimer, the term of this patent is extended or adjusted under 35 U.S.C. 154(b) by 0 days.

(21) Appl. No.: 09/856,504

(22) PCT Filed: Dec. 17, 1999

(86) PCT No.: PCT/CA99/01205
§ 371 (c)(1),
(2), (4) Date: Aug. 30, 2001

(87) PCT Pub. No.: WO00/37369
PCT Pub. Date: Jun. 29, 2000

Related U.S. Application Data
(60) Provisional application No. 60/133,249, filed on May 6, 1999.

(30) Foreign Application Priority Data
Dec. 18, 1998 (CA) .............................................. 2256989

(51) Int. Cl.⁷ ........................... B01D 65/02; C02F 3/06; C02F 3/30
(52) U.S. Cl. ...................... 210/605; 210/614; 210/617; 210/630; 210/631; 210/636; 210/96.2; 210/143; 210/221.2; 210/321.69
(58) Field of Search .................. 210/96.2, 141, 210/143, 220, 221.2, 321.69, 605, 614, 630, 636, 650, 138, 617, 631, 151

(56) References Cited
U.S. PATENT DOCUMENTS

| | | | |
|---|---|---|---|
| 4,425,231 A | 1/1984 | Fujimoto et al. | 210/96.1 |
| 4,904,387 A | 2/1990 | Jordan | 210/605 |
| 5,248,424 A * | 9/1993 | Cote et al. | 210/636 |
| 5,266,200 A | 11/1993 | Reid | 210/605 |
| 5,624,565 A | 4/1997 | Lefevre et al. | 210/614 |
| 5,906,746 A | 5/1999 | Helmo et al. | 210/614 |
| 5,932,099 A * | 8/1999 | Cote et al. | 210/605 |
| 6,245,239 B1 * | 6/2001 | Cote et al. | 210/636 |

FOREIGN PATENT DOCUMENTS

| | | |
|---|---|---|
| EP | 0695722 | 2/1996 |
| FR | 2737202 | 7/1995 |
| JP | 62181772 | 8/1987 |
| JP | 768294 | 3/1995 |
| JP | 839088 | 2/1996 |
| JP | 08187494 | 7/1996 |
| JP | 11314025 | 3/1998 |

* cited by examiner

Primary Examiner—Joseph Drodge
(74) Attorney, Agent, or Firm—Andrew Alexander (57) ABSTRACT

A single tank submerged membrane bioreactor for treating feed water having unacceptable levels of ammonia or total nitrogen has both a membrane scouring bubble supply and an oxygenating bubble supply. The membrane scouring bubble supply continuously provides large scouring bubbles to clean the membranes. Permeate is continuously withdrawn from the membranes at a high rate but the large scouring bubbles do not transfer sufficient oxygen to the mixed liquor to create aerobic conditions in the reactor. The oxygenating bubble supply is operated to provide small bubbles of air or oxygen that intermittently produce aerobic conditions in a significant part of the mixed liquor. Alternating aerobic and anoxic conditions occur in a significant portion of the tank suitable for nitrification and denitrification. The level of dissolved oxygen (DO) or oxygen reduction potential (ORP) in the tank is measured by sensors and determines when the oxygenating bubble supply will be turned on or off between set minimum and maximum time limits.

13 Claims, 11 Drawing Sheets

SUBMERGED MEMBRANE BIOREACTOR FOR TREATMENT OF NITROGEN CONTAINING WATER

CROSS REFERENCE TO RELATED APPLICATIONS

This application is a 371 of PCT/CA99/01205, which claims priority from Canadian Patent Application No. 2,256,989; filed Dec. 18, 1998 and U.S. Provisional Patent Application No. 60/133,249; filed May 6 1999. The disclosures of Canadian Patent Application No. 2,256,989 and U.S. Provisional Patent Application No. 60/133,249 are incorporated herein by this reference to them.

FIELD OF THE INVENTION

This invention relates to a process and apparatus for treating municipal, industrial, agricultural or other wastewater feeds in a submerged membrane bioreactor. Specifically, the invention concerns the removal of ammonia and total nitrogen in a single tank submerged membrane bioreactor through the processes of nitrification and denitrification.

BACKGROUND OF THE INVENTION

Excessive nitrogen is often introduced into the environment through the discharge of municipal, industrial, agricultural and other wastewaters. Such wastewater feeds contain organic nitrogen primarily in the form of proteins and ammonia. During wastewater treatment, ammonia and other sources of total nitrogen are partially oxidized to produce nitrites and nitrates which can be hazardous to the x environment. For example, discharging excessive amounts of total nitrogen into rivers and lakes contributes to their eutrophication which is characterized by frequent algal blooms and reduced levels of free oxygen available to plants and fish. Recently, many jurisdictions have started to regulate the amounts of total nitrogen and ammonia that may be discharged from wastewater treatment plants.

To remove ammonia and total nitrogen from wastewater, bacteria in a bioreactor are used to alternately nitrify and denitrify the water. During nitrification, a two step process converts ammonia into nitrites and nitrates. Firstly, bacteria primarily of the genus Nitrosomonas oxidize the ammonia and convert it to nitrite. Secondly, bacteria primarily of the genus Nitrobacter oxidize the nitrite and convert it to nitrate. Since oxidation occurs in both steps of the nitrification process, an aerobic environment is required. During denitrification, nitrate is converted to ammonia and nitrogen gas by other bacteria (which could include the bacteria mentioned above after they have switched functions) and fungi which remove oxygen from the nitrate. Anoxic conditions are needed to encourage the growth of such bacteria. After denitrification, the nitrogen gas leaves the process and joins the atmosphere and the ammonia is treated by further nitrification and denitrification steps. By cycling back and forth between nitrification and denitrification steps, or aerobic and anoxic conditions in the bioreactor, nitrogen continuously leaves the water reducing the levels of total nitrogen and ammonia in the wastewater.

Submerged membrane bioreactors have been used to remove biological oxygen demand (BOD) and suspended solids from wastewater streams but they are difficult to use under anoxic conditions. A membrane bioreactor typically comprises a plurality of ultraporous or microporous membranes submerged in a tank of wastewater with suction applied to one side of the membranes. Clean water permeates through the membrane walls but bacteria and suspended solids are rejected by the membranes and remain in the tank to be biologically treated. To prevent pollutants in the tank from rapidly fouling the pores of the membranes, the membranes are typically kept awash in air bubbles. Without aeration, the membranes would quickly foul and lose their permeability, but the aeration prevents anoxic conditions and denitrification from occurring in the membrane bioreactor.

Multistage systems have been used to provide both aerobic and anoxic conditions for nitrogen treatment. In these systems, an aerated membrane bioreactor is used to provide an aerobic environment suitable for digesting BOD and nitrifying ammonia. A second bioreactor, without a membrane, provides an anoxic environment for denitrifcation and partially treated wastewater (mixed liquor) continually flows between the two tanks. These systems are undesirable in many applications because the cost and space required for the second tank and mixed liquor transfer apparatus is prohibitive.

Nitrogen has also been treated in commercial applications in a single tank membrane bioreactor where the oxygen content in the bioreactor is varied to produce alternating aerobic and anoxic conditions. In these systems, permeation through the membranes typically stops during the anoxic phase to avoid membrane fouling in the absence of membrane aeration. The loss of permeation during the anoxic phase significantly reduces the daily yield of filtered permeate through the membranes and is a disadvantage of these systems.

Japanese Patent Application No. HE I 5-220346 discusses a system combining the single tank and multistage systems described above. The system has an anoxic tank for denitrification and a membrane bioreactor for nitrification and digesting BOD with mixed liquor recirculating between them. Filtered effluent is permeated through submerged membranes filters in the membrane bioreactor. If the rate of denitrification in the anoxic tank is insufficient, the air supply to the membrane bioreactor is discontinued, to bring the tank into anoxic conditions. However, when the air supply to the membrane bioreactor is disconnected, permeation through the submerged membrane filter is also stopped to prevent membrane fouling. Again the average yield of the system is compromised.

Japanese Patent Application HI 6-181645 describes a single tank membrane bioreactor for treating nitrogen which is cycled between aerobic and anoxic conditions by alternately turning an air supply to the membranes off and on. In one embodiment, an attempt was made to continue to permeate effluent through the membranes during the anoxic phase. Each anoxic phase was started with a minimum level of mixed liquor in the bioreactor and the level of mixed liquor was allowed to rise to a maximum level by the end of the anoxic phase so that a reduced amount of permeate could be withdrawn during the anoxic phase. The yield of the system was reduced because permeate was not withdrawn at the full rate during the anoxic phase and yet it was found that the membranes still fouled quickly. In another mode of operation, aeration was again used during an aerobic period and then stopped to allow an anoxic phase to begin. Permeation through the membranes was stopped at the beginning of the anoxic phase but resumed after the mixed liquor had settled to the bottom of the bioreactor. With this method, the time needed to allow the mixed liquor to settle undesirably reduces the frequency at which the reactor can be switched between anoxic and aerobic phases and the system yield is still reduced because permeation stops during the settling period.

European Patent Application EP 0 695 722 A1 shows in its second embodiment a single tank membrane bioreactor also containing vinylidene chloride fillers. The bioreactor is continuously aerated. A layer of microoigarisms on the vinylidene chloride fillers is dispersed and broken into a fine floc every 12 hours to consume oxygen so as to create anaerobic conditions in the bioreactor.

SUMMARY OF THE INVENTION

It is an object of the invention to provide a simple and cost effective membrane bioreactor that produces a high yield of water having acceptable levels of nitrogenous compounds. In particular, it is an object of the invention to provide a singe tank membrane bioreactor which can be cycled between primarily anoxic and aerobic conditions without stopping or reducing the rate of permeation during the anoxic phase.

To accomplish these and other objects, the present invention is directed at an apparatus for treating feed water with pollutants containing nitrogen in a bioreactor having:

(a) a tank for holding mixed liquor to be treated;

(b) a feed water inlet to the tank;

(c) at least one membrane having a first side in fluid communication with mixed liquor in the tank and a second side in fluid communication with a header;

(d) a source of negative pressure to the header;

(e) a membrane scouring bubble supply; and, (f) an oxygenating bubble supply actuatable between on and off states.

The invention is further directed at a process wherein the membrane scouring bubble supply, located below the membrane or membranes, continuously provides large scouring bubbles to clean the membranes. Treated water is Permeated through the membranes continuously at a high rate of yield but the large bubbles do not transfer sufficient oxygen to the feed water to create aerobic conditions throughout the reactor. The large scouring bubbles create an airlift effect which causes a recirculation pattern in the mixed liquor but oxygen is depleted from the mixed liquor or diluted as the mixed liquor travels away from the membranes. The concentration of dissolved oxygen is reduced in a region below or adjacent to the bottom of the membranes, and at least this region is anoxic when air is supplied by the scouring bubbles alone. If necessary, the large scouring bubbles are captured in a hood after they have scoured the membranes to provide an oxygen lean source of further scouring bubbles.

The oxygenating bubble supply is operated intermittently and provides small bubbles of air or oxygen to intermittently produce aerobic conditions in at least part of the tank. Minimum and maximum periods of aeration and non-aeration through the oxygenating bubble supply are preselected but the level of dissolved oxygen (DO) or oxygen reduction potential (ORP) in the tank is measured by sensors and assists in controlling the aerating bubble supply. In particular, a period of aeration is terminated if it is within the time limits and the level of DO or ORP in the tank exceeds a maximum value and a period of non-aeration is terminated if it is within the time limits and the level of DO or ORP in the tank drops below a minimum value.

BRIEF DESCRIPTION OF THE DRAWINGS

A preferred embodiment or embodiments of the invention will now be described below with reference to the following Figures.

DETAILED DESCRIPTION OF THE INVENTION

Figure 1:
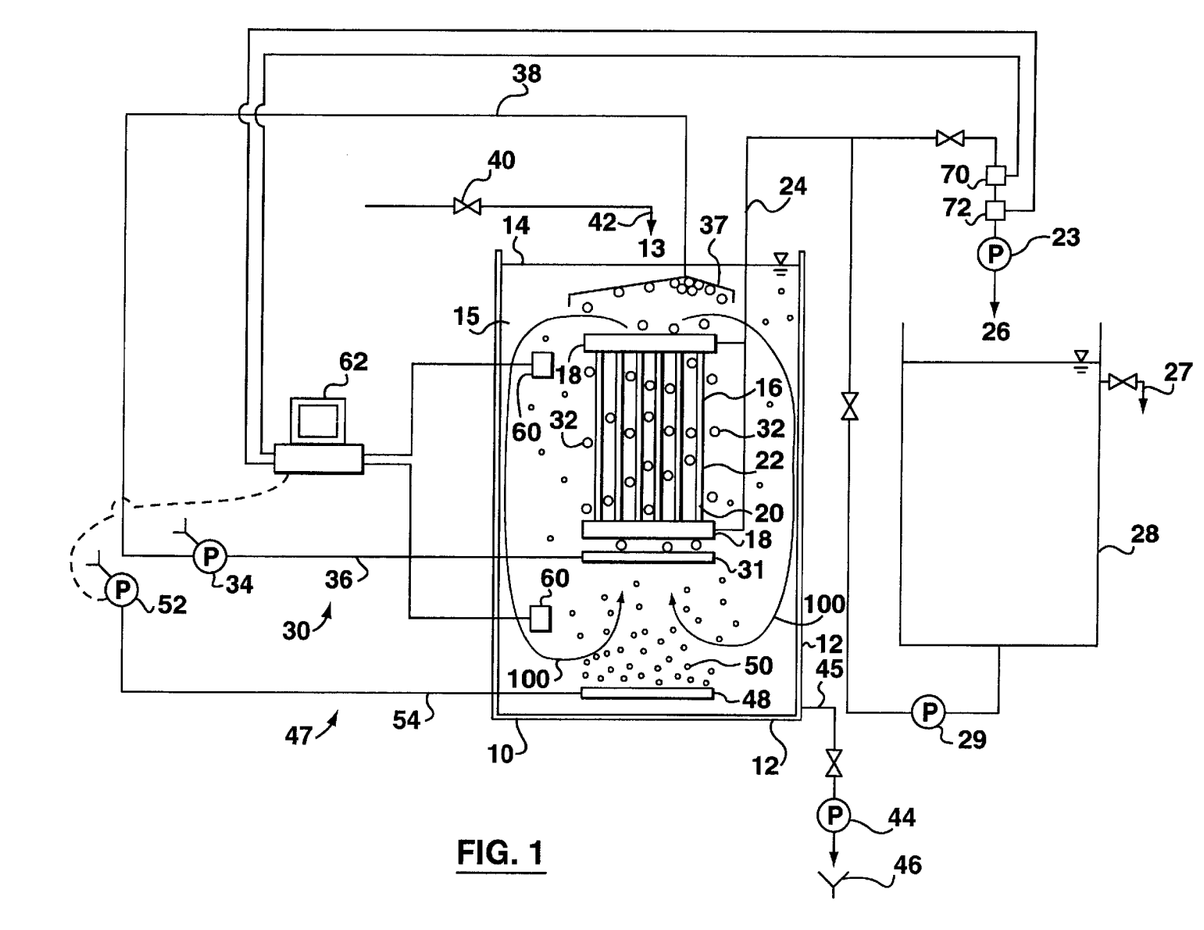
FIG. 1 is a representation of an apparatus according to an embodiment of the invention.

Referring now to FIG. 1, shown therein is a reactor 10 made in accordance with a preferred embodiment of the invention. The reactor 10 has a tank 12 which is initially filled with feed water 13 through an inlet 42 and a feed valve 40. The feed water 13 is typically propelled to the tank 12 from a reservoir not illustrated through a screened grinder pump also not illustrated, although the feed water 13 may also be delivered to the tank 12 by gravity flow depending on the arrangement of the treatment plant. Once in the tank, biological processes alter the feed water 13 and it is referred to as mixed liquor 15. A membrane module 16 mounted in the tank 12 has upper and lower headers 18 in fluid communication with the lumens 20 of hollow-fibre membranes 22. The tank 12 is kept filled with mixed liquor 15 to a water level 14 which is above the level of membranes 22 by controlling feed valve 40 to add feed water 13 as necessary.

The membranes 22 preferably have an average pore size between 0.01 microns and 10 microns and more preferably have an average pore size between 0.02 microns and 1 micron. Suitable membranes include those manufactured by Zenon Environmental Inc. and sold under the ZEEWEED trade mark but other submerged outside-in membranes may be used such as those manufactured by Mitsubishi Rayon or Kubota. The membrane module 16 is preferably placed in the tank 12 at least 15 cm and less than 4.5 m, and more typically between 0.3 m and 1.3 m, from the bottom of the tank 12 to allow fluid to reach the bottom of the membrane module 16. The membrane modules 16 may be located in the middle of the tank 12 or along one wall of the tank 12.

Water is permeated continuously through a permeate line 24 joining a permeate pump 23 to the headers 18. Suction created by the permeate pump 23 creates a transmembrane pressure across the walls of the membranes 22. The membranes 22 reject bacteria or suspended solids but allow filtered permeate 26 to permeate through the walls of the membranes 22 from a first side, the outsides, to a second side, the lumens 20. The filtered permeate 26 is stored in a permeate tank 28 and later released through a permeate outlet 27. A backwash pump 29 is used to periodically pump permeate 26 back through the membranes 22 in a reverse direction for additional cleaning but the time required for such backwashing is minimal and the process is still considered to be continuous.

A scouring bubble supply 30 has a membrane aerator 31, a membrane air pump 34 and a membrane air line 36. The membrane aerator 31 is located below and in close proximity to the membrane module 16 and delivers scouring bubbles 32 to the membrane module 16. The scouring bubbles 32 are preferably made of air and more preferably of oxygen depleted air supplied from the membrane air pump 34 through the membrane air line 36. The scouring bubbles 32 rise upwards through the membrane module 16 and inhibit fouling of the membranes 22. The scouring bubbles 32 also create an air lift which mixes and recirculates the mixed liquor 15.

The scouring bubbles 32 have an average diameter preferably between 5 mm and 20 mm. At this size, the scouring bubbles 32 flow rapidly through the membranes 22 to provide effective cleaning but little time for oxygen to be transferred to the mixed liquor 15. Large scouring bubbles 32 have a reduced ratio of surface area to volume compared to small bubbles which further inhibits oxygen transfer. In addition, large scouring bubbles 32 tend to reach the surface of the mixed liquor 15 and burst whereas smaller bubbles more often become entrained in the recirculating mixed liquor 15.

Optionally, a bubble collector 37 located above the membrane module 16 and connected to the membrane air pump 34 through a gas line 38 collects scouring bubbles 32 for reuse. Since many biological processes occurring in the mixed liquor 15 use oxygen, the re-used scouring bubbles 32 have reduced oxygen content.

Under the influence of the scouring bubbles alone, the mixed liquor 15 is maintained under anoxic conditions throughout most of the tank 12, which enables appropriate bacteria to grow to cause denitrification of the mixed liquor 15. It is not necessary that all parts of the tank 12 be anoxic for sufficient denitrification to occur. The scouring bubbles 32 create an airlift effect which causes the mixed liquor to move in a recirculation pattern 100 in the tank 12. As the mixed liquor 15 moves away from the membrane module 16, dissolved oxygen is depleted and diluted so that the concentration of dissolved oxygen in the mixed liquor 15 is reduced. In at least one area or region of the tank 12, the mixed liquor 15 is anoxic when air is supplied by the scouring bubbles alone. This anoxic region typically occurs below or adjacent to the bottom of the membrane module 16, but may also extend upwards to an area beside the membrane module 16. The area immediately surrounding the membrane module 16 is less likely to be anoxic than other parts of the tank 12 but is sufficiently small that the supply of scouring bubbles 32 need not be compromised to produce anoxic conditions there. For example, a typical flux of air for scouring bubbles may be between 0.8 and 2.1 m$^3$/h (at standard temperature and pressure) per square metre of membrane surface area. Using the techniques described below if necessary, it is not typically necessary to depart significantly from typical ranges of scouring air flux.

Anoxic conditions occur when there is less than 0.5 mg/L of dissolved oxygen (DO) in the mixed liquor 15. Preferably, there is less than 0.2 mg/L of DO in a substantial part of the mixed liquor 15 although the concentration of DO may vary in the tank 12, some anoxic areas being near 0.05 mg/L of DO and others being near 0.5 mg/L DO. The calculation of the amount of oxygen that can be added by the scouring bubbles 32 to maintain the desired level of DO concentration will be apparent to those skilled in the art and may vary for different installations. Generally, the calculation involves multiplying the volume of the mixed liquor 15 by the desired concentration of DO to get a total permissable amount of oxygen and then comparing oxygen sources, such as oxygen introduced by the feed water 13 or dissolving into the mixed liquor 15 at the top of the tank 12, with oxygen losses such as use by the organisms in the mixed liquor 15 during the anoxic phase. Once the maximum amount of oxygen that can be added by the scouring bubbles 32 is known, it is preferably met for a given tank 12 by increasing the size of the scouring bubbles 32 as necessary or increasing the concentration of microorganisms which use oxygen in the mixed liquor 15 and less preferably by using the collector 37 to recycle oxygen depleted air.

In addition to manipulating the reactor 10 as described above, the size and configuration of the tank is effectively used to achieve anoxic conditions despite the scouring bubbles 32. Increasing the total size of the tank 12 provides a greater volume of mixed liquor 15 and thus reduces the increase in concentration of DO which results from oxygen transferred from the scouring bubbles 32. However, a large tank is more expensive and merely increasing the size of the tank is not preferred. Preferably, the tank 12 remains within the size range of ordinary membrane bioreactor tanks but the membrane module 16 is placed near the top of the tank 12. Scouring air bubbles 32 largely burst at the surface and infrequently travel to the area beneath the membrane module 16. A deep tank, relative to the height of the membrane module 16, is preferable to maximize this effect. Alternatively, baffles can be provided below the membrane module 16 to partially isolate an area near the bottom of the tank which is minimally effected by the recirculation of mixed liquor in the tank 12 until aerated as will be described further below.

Since the feed water 13 first entering the tank 12 is high in ammonia and should first be nitrified, it is preferable if the inlet 42 directs the feed water 13 to enter the tank 12 directly over the membrane module 16. Although the inlet 42 may satisfactorily direct the feed water 13 to any other part of the tank 12, by dumping it over the membrane module 16, oxygen is removed from the scouring bubbles 32 and the feed water 13 is partially nitrified even if the mixed liquor 15 is in a substantially anoxic condition.

As described above, anoxic conditions and denitrification occur in a substantial portion of the mixed liquor 15 when under the influence of scouring bubbles 32 alone. However, at least a significant part of the mixed liquor 15 must cycle back and forth between anoxic and aerobic conditions so that nitrification can also occur. Further, BOD is partially removed under anoxic conditions but is more quickly removed under aerobic conditions.

To produce aerobic conditions, the reactor 10 has an independent oxygenating bubble supply 47 which can be controlled to produce alternating aerobic and anoxic conditions in at least a significant part of the mixed liquor 15. The oxygenating bubble supply 47 has a process aerator 48 which produces oxygenating bubbles 50 with air or oxygen supplied from a process air pump 52 through a process air line 54. If the membrane module 16 is located at one side of the tank 12, then the process aerator 48 is preferably located at the bottom of the tank 12 on the opposite side from the membrane module 16. If the membrane module 16 is located in the centre of the tank 12, then the process aerator 48 is preferably located at the centre of the bottom of the tank 12.

Aerobic conditions suitable for nitrification and rapid BOD digestion are achieved in a significant portion of the mixed liquor 15 by turning on the oxygenating bubble supply 47. The mixed liquor is considered to be aerobic when the concentration of DO is greater than 0.5 mg/L although the concentration of DO in an aerobic zone is preferably between 0.5 mg/L and 5.0 mg/L for aerobic digestion and nitrification and more preferably between 0.5 mg/L and 2.5 mg/L. The oxygenating bubbles 50 are preferably small, with an average diameter between 0.5 mm and 5.0 mm, to provide an efficient transfer of oxygen to the mixed liquor 15.

Typically, denitrification often occurs more slowly than nitrification and can limit the overall rate of removal of nitrogenous compounds in the process. It is preferred if the oxygenating bubbles 50 are sufficient in combination with the scouring bubbles 32 (whose supply may be increased in the aerobic phase) to produce aerobic conditions near the membrane module 16 and bottom of the tank 12 but are insufficient to make all regions of the tank 12 become aerobic. In this way, the reactor 10 does not cycle completely between aerobic and anoxic conditions, but has an area in or near the centre of the membrane module 16 which is always aerobic and an area near the bottom of the tank 12 which is always anoxic. The use of the terms aerobic and anoxic thus indicate times or places in which the mixed liquor 15 is on average aerobic or anoxic. More precisely, however, there are primarily aerobic and primarily anoxic zones in the tank 12 which become larger and smaller relative to each other and some nitrification and denitrification occurs simultaneously. Since denitrification is the limiting reaction, the average size of the anoxic zone in time and space is preferably larger than the average size of the aerobic zone over the same time and space.

To assist in controlling the oxygenating bubble supply 47, at least one sensor 60 is located in the tank 12 and connected to a microprocessor 62 which controls the process air pump 52. Preferably, at least two sensors 60 are used, one above and one below the membrane module 16 so that the change in size, of the aerobic and anoxic zones as well as the change in their respective concentration of DO can be monitored. The sensors 60 record the concentration of DO in the mixed liquor 15 directly or, preferably, measure the oxygen reduction potential (ORP) of the mixed liquor 15. ORP is related to the concentration of DO but ORP sensors are more sensitive.

Figure 2:
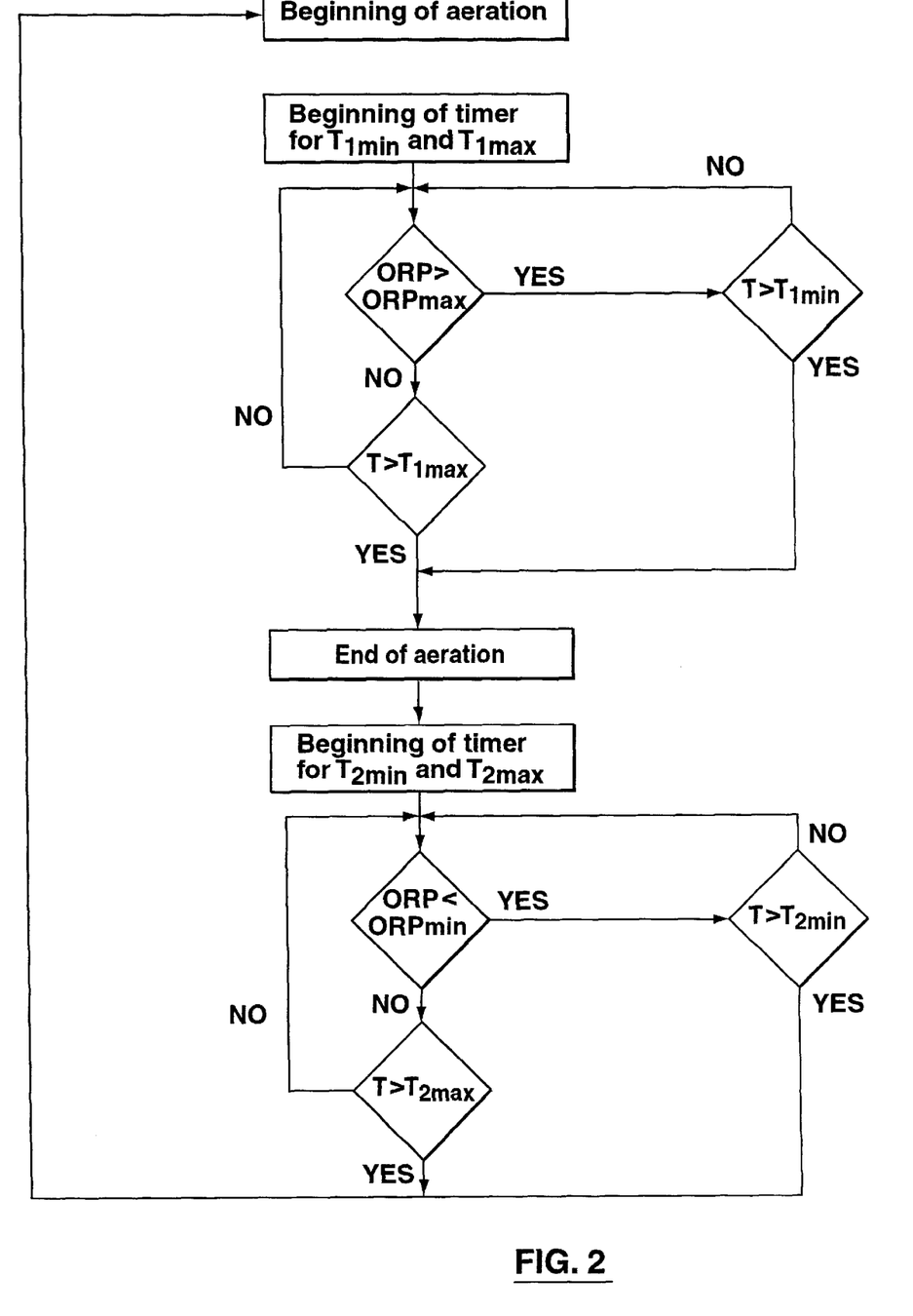
FIG. 2 is a flow chart showing a method of controlling the apparatus according to an embodiment of the invention.

Now referring to FIG. 2, a control flow chart is shown which illustrates the process steps accomplished by the microprocessor 62 reading a sensor 60 near the top of the tank 12 in controlling the process air pump 52. As illustrated, the time between the beginning and end of aeration is set between T1min and T1max. T1min is chosen to reflect the minimum amount of time needed to achieve organic carbon and ammonia conversion should the organic load to the bioreactor increase excessively during the present step and is preferably between five minutes and two hours. T1max is chosen to limit the maximum aerobic time during low load periods so that adequate anaerobic time occurs and is preferably between ten minutes and eight hours. At the beginning of aeration, the microprocessor 62 sets a timer and begins to periodically check the level of ORP in the mixed liquor 15. If at any time greater than T1min the microprocessor 62 detects a level of ORP of greater than ORPmax, then the microprocessor ends aeration. Preferably, ORPmax is between 200 an 250 mV. If T1max is reached, the microprocessor also ends aeration.

The time between the beginning and end of non-aeration is set between T2min and T2max. T2min is chosen to provide a minimum anoxic time during low load periods and is preferably between five minutes and two hours. T2max is chosen to provide a maximum anoxic time during high load periods and is preferably between ten minutes and eight hours. At the end of aeration, the microprocessor 62 sets a timer and begins to periodically check the level of ORP in the mixed liquor 15. If at any time greater than T2min the microprocessor 62 detects a level of ORP less than ORPmin, then the microprocessor ends starts aeration. Preferably, ORPmin is between −50 mV and 50 mV. If T2max is reached, the microprocessor also starts aeration and the cycle is repeated.

The choice of times for T1min, T1max, T2min and T2max obviously relate to each other and so the time given to any one parameter must be reasonable compared to the other parameters. For example, if times at the high end of the acceptable ranges are chosen for T1min and T1max, then times at the low end of the acceptable ranges should not be chosen for T2min and T2max or the system may be aerobic for too much time in any given period of time. Generally, higher time periods are preferable for systems with a high sludge age or hydraulic retention time and lower time periods are preferable for systems with lower sludge age or hydraulic retention times. Further, in many jurisdictions, limits on ammonia in the permeate are stricter than limits on total nitrogen since ammonia is a toxin. If so, then the parameters may be chosen to favour the aerobic part of the cycle as necessary. Finally, the minimum and maximum times may be chosen to reflect constraints imposed by system components. For example, T1min and T2min may be chosen to be greater than 15 minutes to reduce wear on the process air pump 52 from being switched on and off frequently.

At the start of either the aeration period or non-aeration period, the oxygenating bubble supply 47 is preferably controlled so that mixed liquor 15 does not instantaneously change from aerobic to anoxic. The change in concentration of DO in the mixed liquor 15 will naturally lag behind a change in the supply of oxygenating bubbles 50 since it takes time for oxygen to be transferred from bubbles to the mixed liquor 15 and time for the mixed liquor 15 to release or metabolize oxygen when aeration stops. For a given composition and temperature of mixed liquor 15, an oxygen uptake rate or outlet rate can be determined. If these rates are insufficient to get the desired time between anoxic and aerobic conditions in the mixed liquor 15, the microprocessor 62 can gradually decrease power to the process air pump 52 at the end of aeration or gradually increase power to the process air pump 52 at the start of aeration as needed. Ideally, there is a sinusoidal variation between anoxic and aerobic conditions, but it is sufficient if the change in concentration of DO occurs smoothly and over the minimum time period described above.

In some combinations of effluent quality desired, biological loading rates, and membrane flux and recirculation patterns, an alternate control strategy may be required. For example, highly loaded systems, ie. systems with an organic loading greater than 3 kilograms of 5 day BOD per cubic meter per day of feed, may require continuous aeration through the process aerator 48 to avoid anaerobic conditions at the bottom of the tank 12 or may require that the supply of scouring air bubbles 32 be increased during the aerobic phase to provide additional oxygen transfer. Conversely, for very lightly loaded systems, the supply of scouring air bubbles 32 may be reduced during the anoxic phase.

Preferably, the bioreactor is operated at a high concentration of MLVSS because it provides a high level of oxygen demand in the anoxic phase and assists in maintaining anoxic conditions despite the presence of scouring bubbles 32. A high concentration of MLVSS also allows a high organic loading capacity of feed and small bioreactor size. Further, a high concentration of MLVSS allows a high population of nitrifying bacteria to be present whereas, in less highly loaded systems, the population of nitrifying bacteria may be unacceptably low at some times.

Preferably, the average concentration of MLVSS ranges from 10 g/l to 30 g/l and more preferably from 12 g/l to 25 g/l. This generally corresponds with an organic loading of feed between 0.3 kilograms of 5 day BOD per cubic meter per day and 3.0 kilograms of 5 day BOD per cubic meter per day and more preferably between 0.5 kilograms of 5 day BOD per cubic meter per day and 2.0 kilograms of 5 day BOD per cubic meter per day. A drain pump 44 connected to a sludge outlet 45 and a drain 46 allows a portion of the mixed liquor 15 to be continuously or intermittently discharged to maintain a desired and substantially constant suspended solids concentration in the mixed liquor 15.

Preferably, the reactor 10 has a minimum hydraulic retention time of 1.5 hours and, more preferably, the hydraulic retention time is between 1.5 hours and 6 hours. The reactor 10 preferably has a minimum mean cell residence time of 7 days and maximum mean cell residence time of 100 days and is preferably operated with a mean cell residence time between 10 days and 30 days for good growth of nitrifiers.

Although the embodiment shown in FIG. 1 has two sensors 60, a large tank might have many sensors 60, many process aerators 48 and many membrane aerators 31. The microprocessor would then be used to monitor the concentration of DO or ORP throughout the tank 12 and control each process aerator 48 or membrane aerator 31 to prevent any area of the tank 12 from exceeding the minimum concentration of DO for an anoxic zone or the maximum concentration of DO for an aerobic zone. Alternately, the microprocessor 62 could create controlled aerobic areas and anoxic areas simultaneously in the mixed liquor 15.

Additional inputs to the microprocessor 62 come from an ammonia sensor 70 and a total nitrate sensor 72 in the permeate line 24. The ammonia sensor 70 and total nitrate sensor 72 send signals to the microprocessor 62 indicating the concentration of ammonia and total nitrates in the permeate 26. This information is used to determine when the relative lengths of time for the aerobic or anoxic cycles must be adjusted or when the minimum and maximum oxygen concentration limits at any point in the tank 12 should be adjusted. For example, for higher than acceptable total nitrogen concentrations in the permeate 26, the maximum DO in the aerobic stage may be reduced or the rate of change between the anoxic and aerobic cycles may be decreased so that the concentration of DO stays closer to a lower, but still aerobic, value for a longer time period. For high ammonia concentrations in the permeate 26, the reverse adjustments may be made. Ideally, for a particular installation, experience in using the reactor will suggest how the microprocessor 62 is best used to control the reactor 10 under varying conditions of feed water 13.

Although the use of a process aerator 48 producing fine bubbles provides an efficient transfer or oxygen to the mixed liquor, the supply of scouring bubbles 32 can be used alone to vary DO concentrations between anoxic and aerobic conditions at different points in the reactor. Although more power would be required to produce the necessary transfer of oxygen to the mixed liquor 15 with large scouring bubbles 32 and independent control over the concentration of DO in different areas of the tank 12 would be lost, the savings in capital cost of equipment and space may justify this approach in some cases.

Example 1

A waste feed water treating reactor was constructed and operated according to the description above. The apparatus was operated for 16 hours manually controlling the supply of fine bubbles from a process aerator to achieve average DO concentrations in the mixed liquor ranging from 0.05 mg/L to 0.55 mg/L in the anoxic phase (in various parts of the tank) and between 0.1 mg/L and 1.2 mg/L in the aerobic phase (in various parts of the tank). The tank had a volume of 11,000 L and was outfitted with a module of hollow fiber membranes having 13.9 $m^2$ of surface area. The reactor had a hydraulic retention time of 3 hours. The average concentration of MLVSS was approximately 20 g/l. The average organic loading of the feed was 1.3 kg of 5 day BOD per cubic metre per day.

Figure 3:
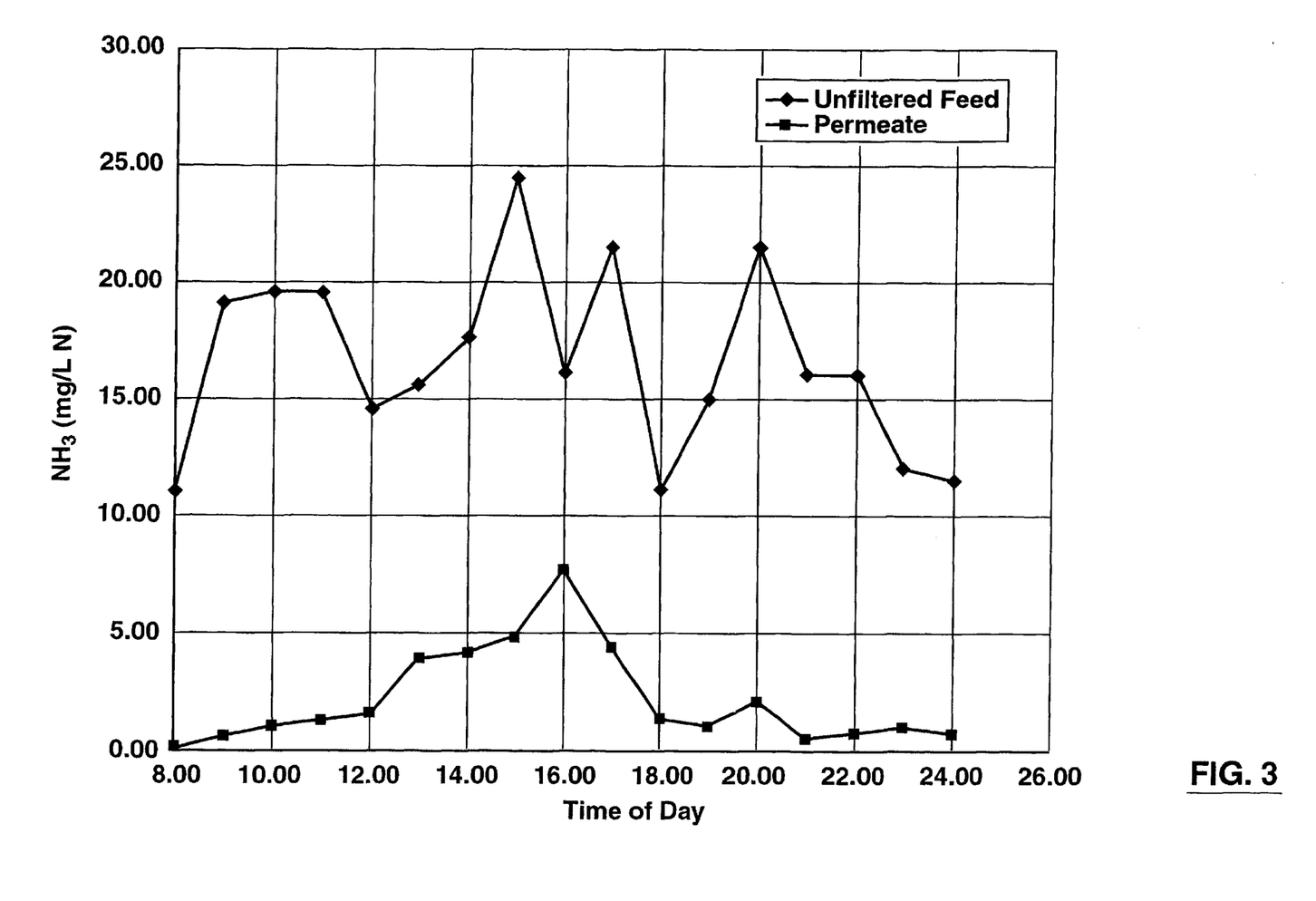
FIGS. 3, 4 and 5 are graphs showing the results of experiments conducted with an embodiment of the invention.
Figure 4:
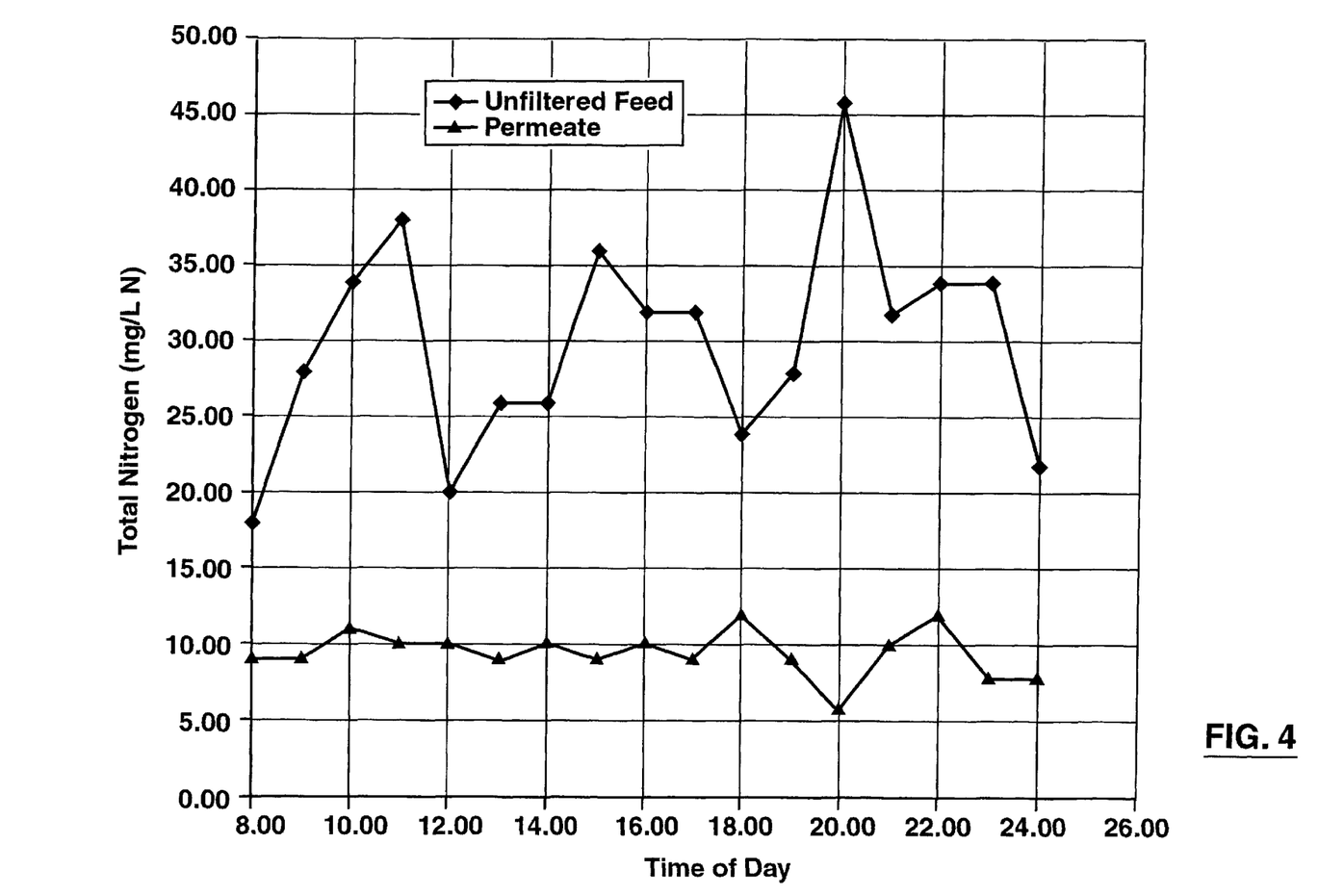
Figure 5:
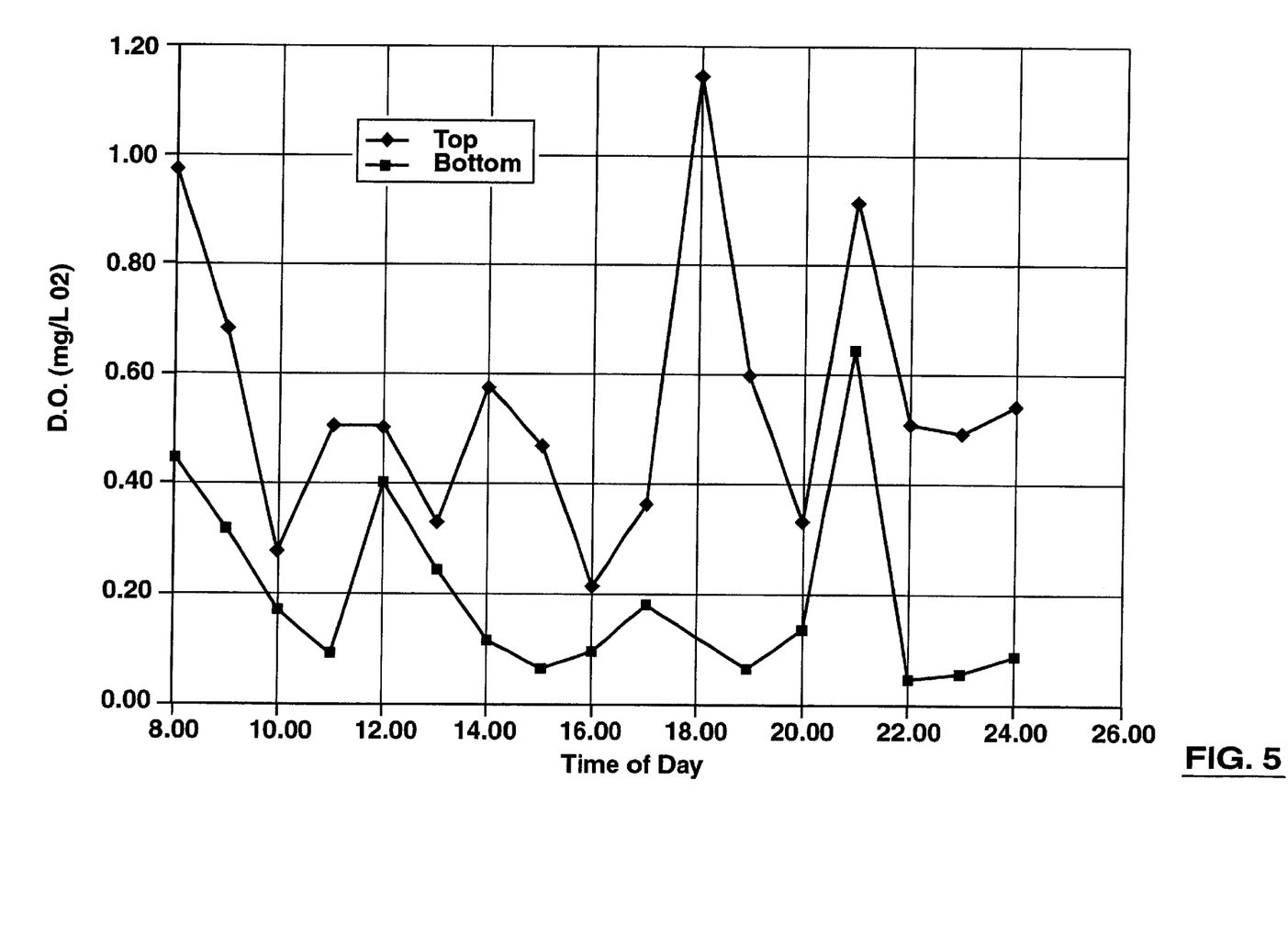

FIGS. 3 shows the ammonia levels in the feed and permeate during the experiment and indicates that the reactor was very effective in removing ammonia, particularly when average concentrations are considered as would emerge from a significantly large permeate tank. FIG. 4 shows the total nitrogen levels in the feed and permeate during the experiment. The average concentration of total nitrogen remained below 10 mg/L which is the maximum concentration allowed in many jurisdictions. FIG. 5 shows the concentration of dissolved oxygen during the experiment and shows that one area of the tank was continuously maintained in an anoxic state while another area of the tank cycled back and forth between anoxic and aerobic states.

Example 2

A second waste feed water treating reactor was constructed and operated according to the description above including a microprocessor used to control the flow of fine air bubbles at the bottom of the tank based on signals received from an ORP sensor at the top of the tank. The tank had a volume of 2.0 $m^3$ and was outfitted with a module of hollow fiber membranes having 13.9 $m^2$ of surface area.

Figure 6:
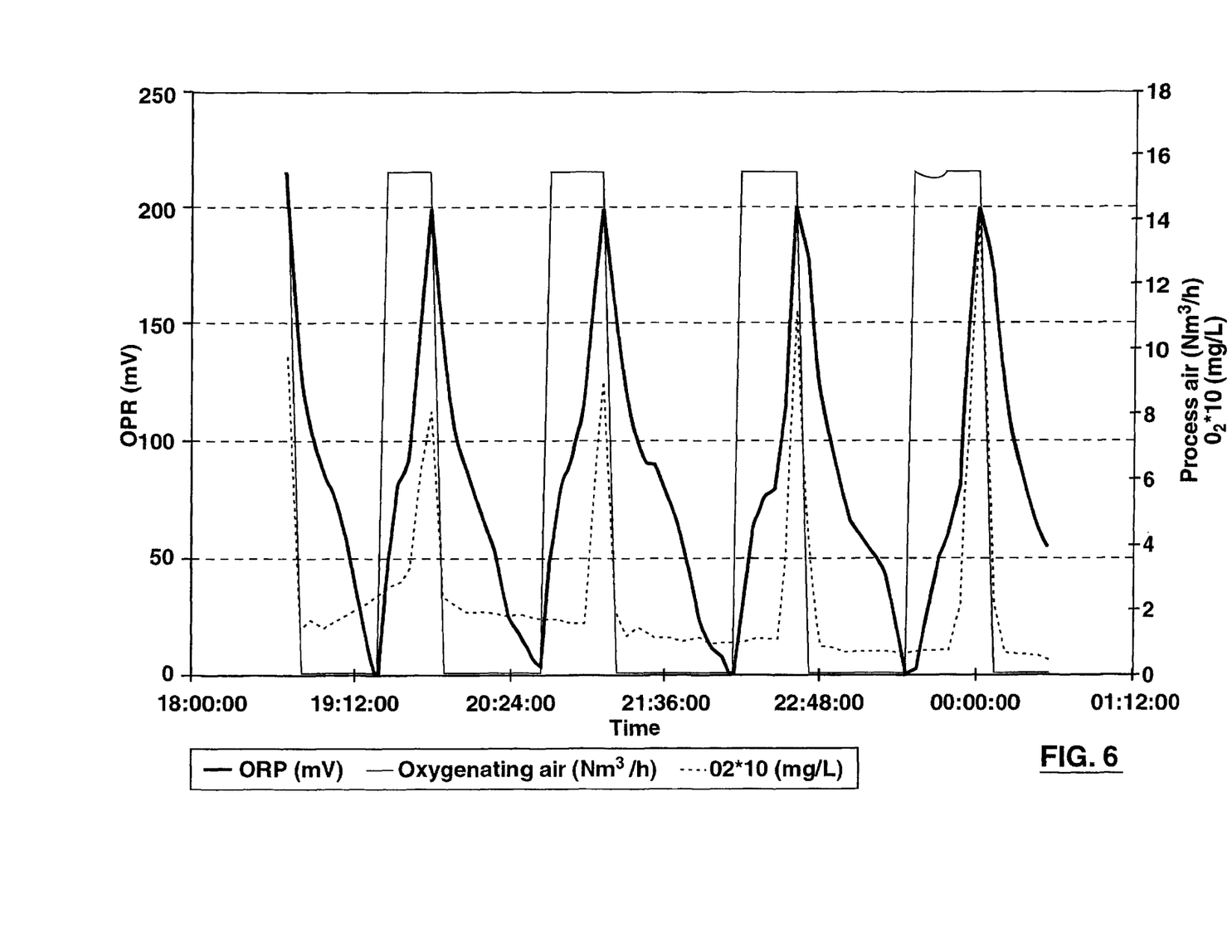
FIGS. 6 and 7 are graphs showing the results of experiments conducted with another embodiment of the invention.
Figure 7:
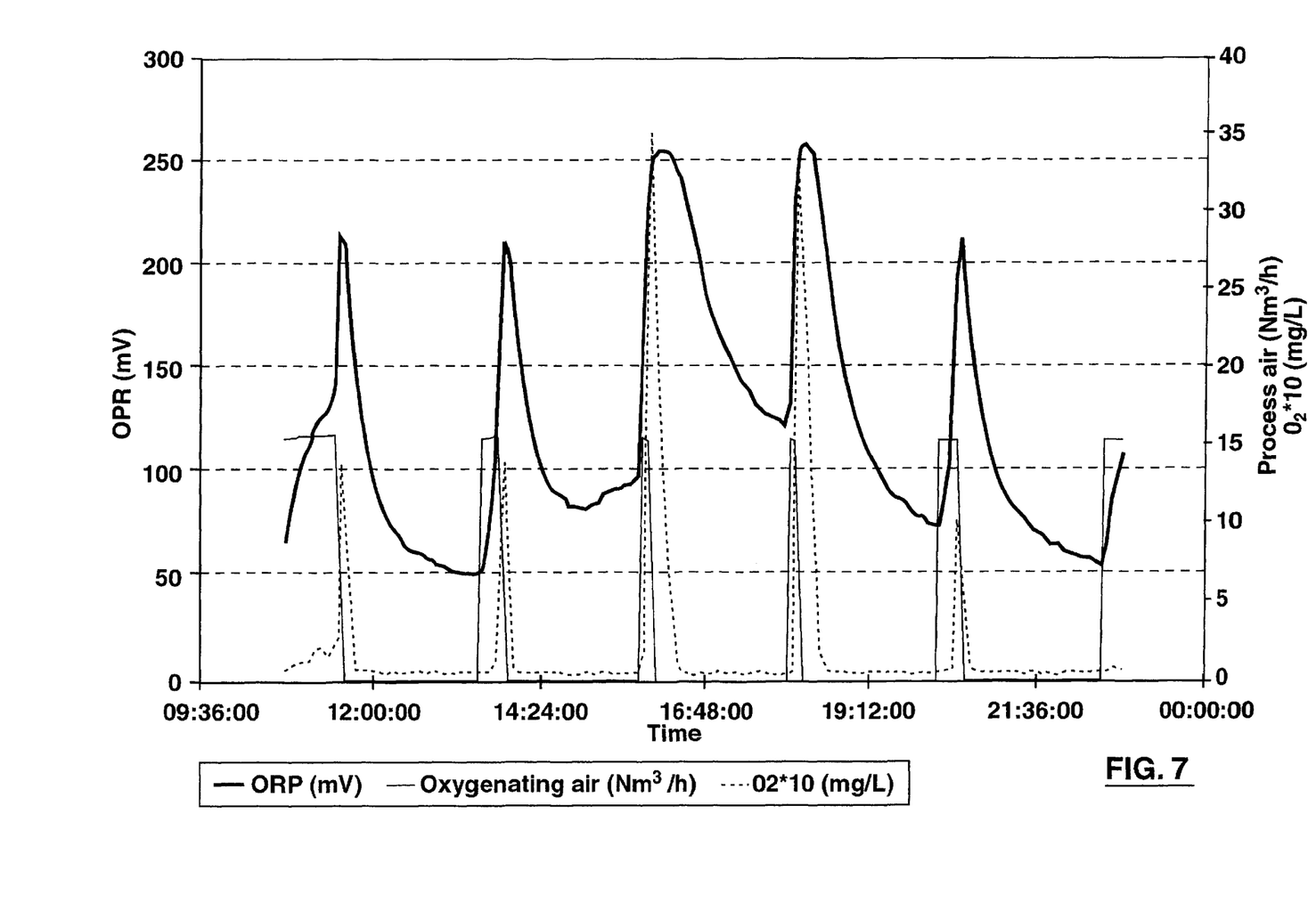

FIG. 6 shows the variation of ORP, concentration of DO and flow rate of aeration to a process aerator in a first trial. In this trial, ORPmax was 200 mV and ORPmin was near 0 mV. FIG. 7 shows the variation of ORP, concentration of DO and flow rate of aeration to a process aerator in a second trial. In this trial, ORPmax was 250 mV and ORPmin was 50 mV. In both trials, the concentration of DO at the top of the tank was effectively cycled between a value less than 0.5 mg/L and a value above 0.5 mg/L.

The concentration of MLVSS during the trials ranged from 15 g/l to 20 g/l and averaged about 18 g/l. The organic loading in the feed varied from about 0.5 kg of 5 day BOD per cubic metre per day to 1.0 kg of 5 day BOD per cubic metre per day. The average concentration of total nitrogen in the permeate was again less than 10 mg/L and both total nitrogen and ammonia removal rates were at least 60%.

Example 3

A third waste water treating reactor was constructed and operated according to the description above, also including a microprocessor used to control the flow of fine air bubbles at the bottom of the tank based on signals received from an ORP sensor at the top of the tank. Except for a brief period noted on the Figures, the feed water had the following characteristics:

|  | Average | Minimum | Maximum |
| --- | --- | --- | --- |
| Turbidity (NTU) | 156 | 89 | 278 |
| Suspended Solids (SS) (mg/L) | 146 | 46 | 531 |

-continued

|  | Average | Minimum | Maximum |
| --- | --- | --- | --- |
| Total Nitrogen (mgN/L) | 51.4 | 18.1 | 66.4 |
| Ammonia (mg N/L) | 40.2 | 12.9 | 51 |
| pH | 7.5 | 7.2 | 7.7 |
| COD(mg/L) | 403 | 151 | 564 |
| Alkalinity (mg/L) | 347 | 212 | 414 |

A module of hollow fibre membranes having 13.9 m² of surface area was used with outside/in permeation driven by a vacuum pump. The tank had a volume of 2.0 m3. Permeation was substantially continuous, stopping only for periodic membrane backwashing. Scouring aeration was provided at all times with course bubbles at a rate of 12 m3/h. After a start up period of about one month, mixed liquor was discharged continuously from a drain to produce a sludge age (reactor volume/flux of waste sludge) of 25 days. Feed water was provided as required to keep the membranes immersed. A stirrer at the bottom of the tank was also operated at all times to provide more nearly homogeneous conditions in the tank. Operating conditions in the tank were as follows:

|  | Average | Minimum | Maximum |
| --- | --- | --- | --- |
| MLSS (mg/L) | 16 | 12.8 | 20.4 |
| Volumetric loading (Kg COD/m3/day) | 1.3 | 0.6 | 2.1 |
| Mass loading (Kg COD/Kg SS/day) | 0.08 | 0.04 | 0.13 |

Figure 8:
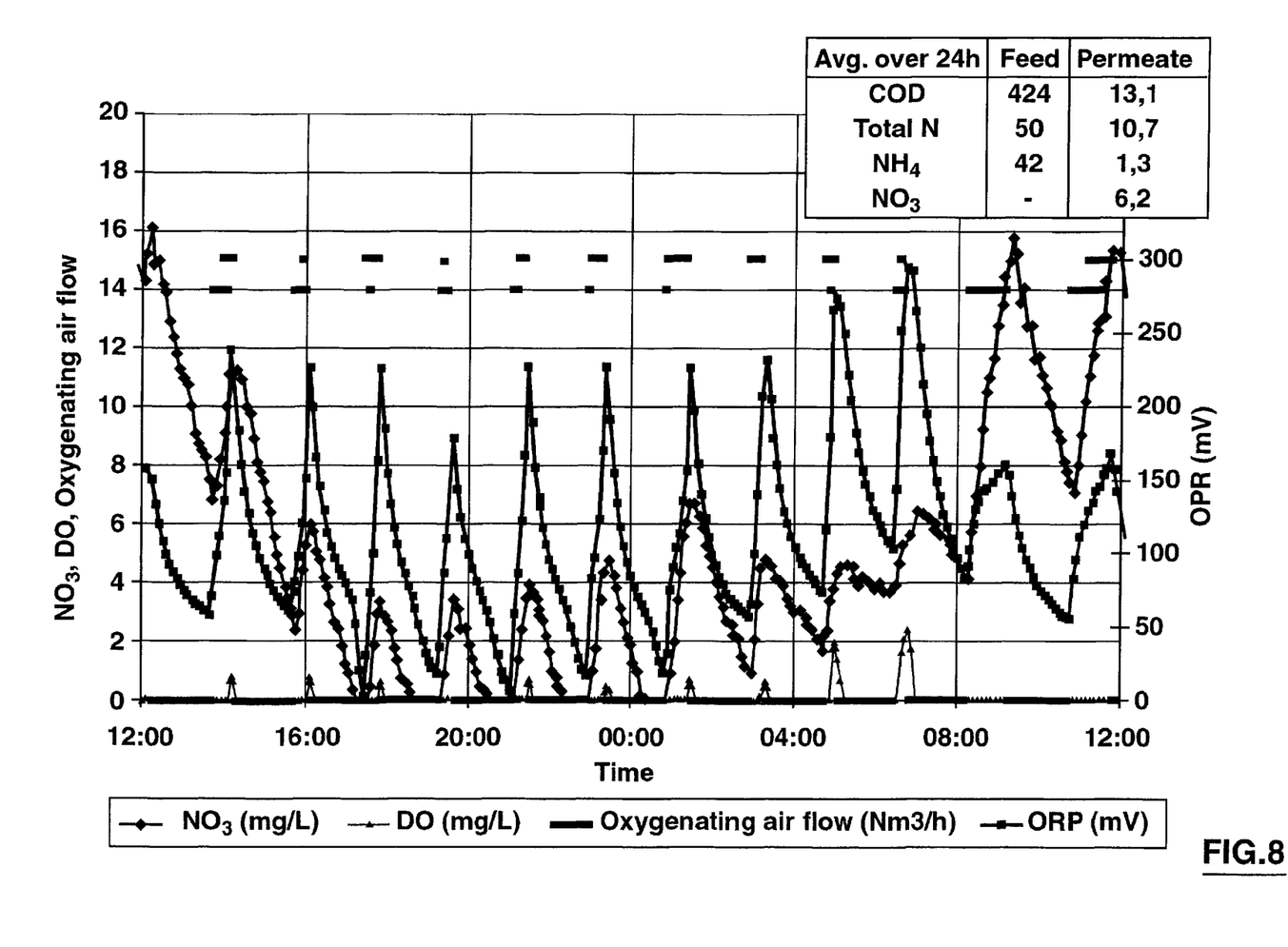
FIGS. 8, 9, 10 and 11 are graphs showing the results of experiments conducted with another embodiment of the invention.

Additional process air was provided intermittently based, after a start up period, on an algorithm as shown in FIG. 2. A single ORP sensor was located about one third of the way down from the top of the tank. ORPmax was 200 mV and ORPmin was −50 mV. T1min and T2min were both 15 minutes and T1max and T2max were both 120 minutes. FIG. 8 shows the variation of ORP, DO, oxygenating air flow, and nitrogen as $NO_3$ over a fairly typical 24 hour period. The average characteristics of the feed water and permeate for this 24 hour period are as shown in FIG. 8. The oxygenating air flow, when on, varied between 14 and 15 m³/h at standard conditions.

Figure 9:
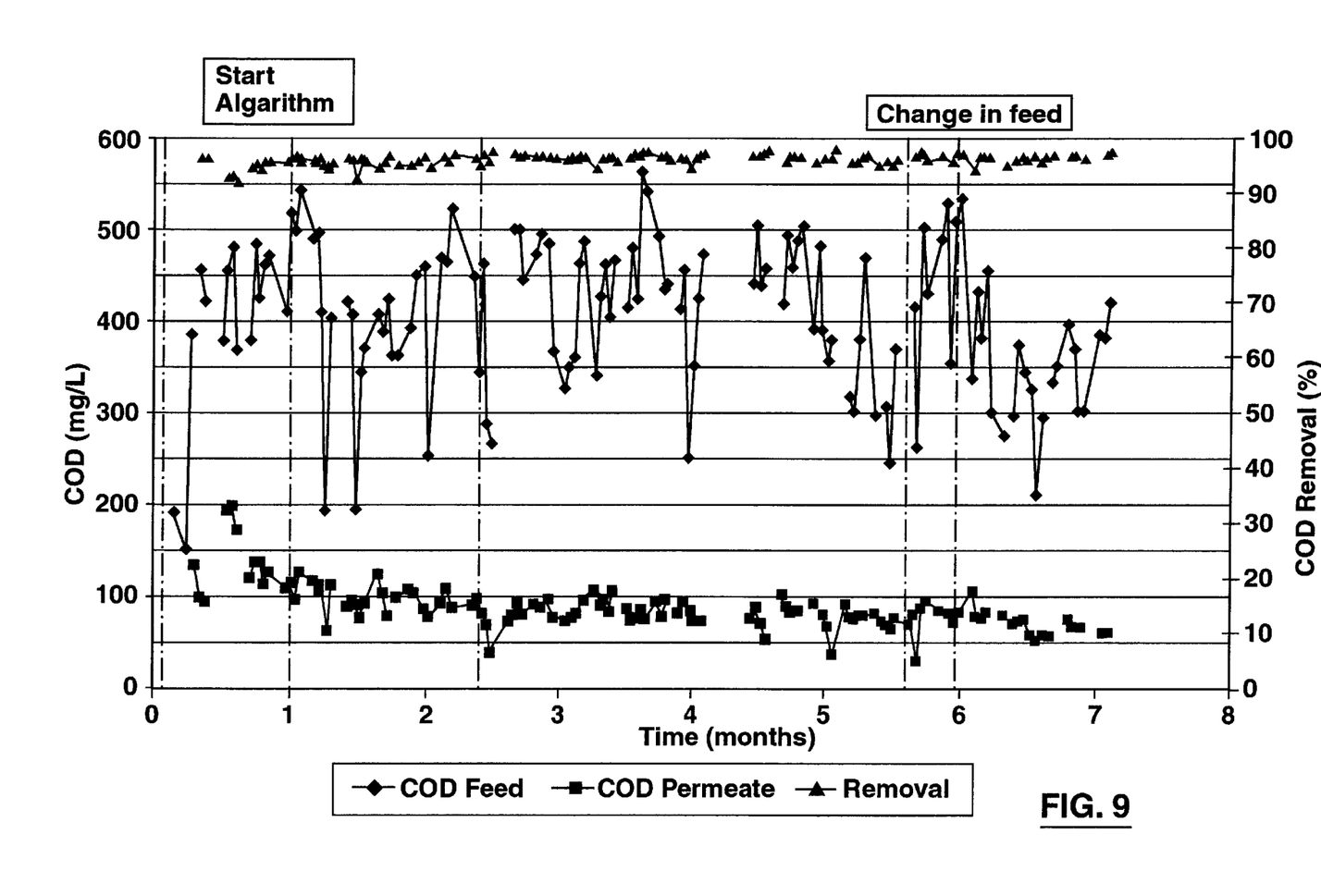
Figure 10:
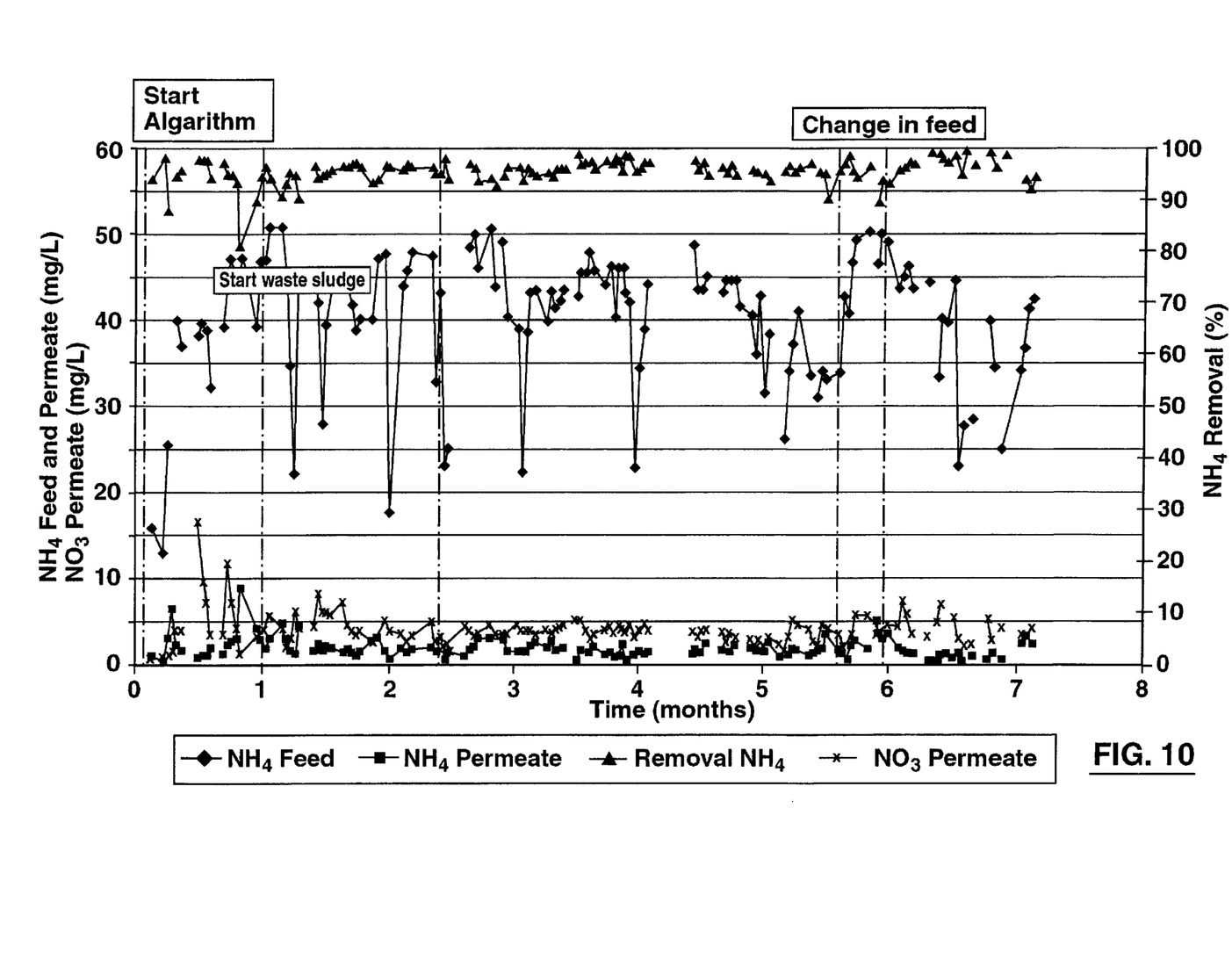
Figure 11:
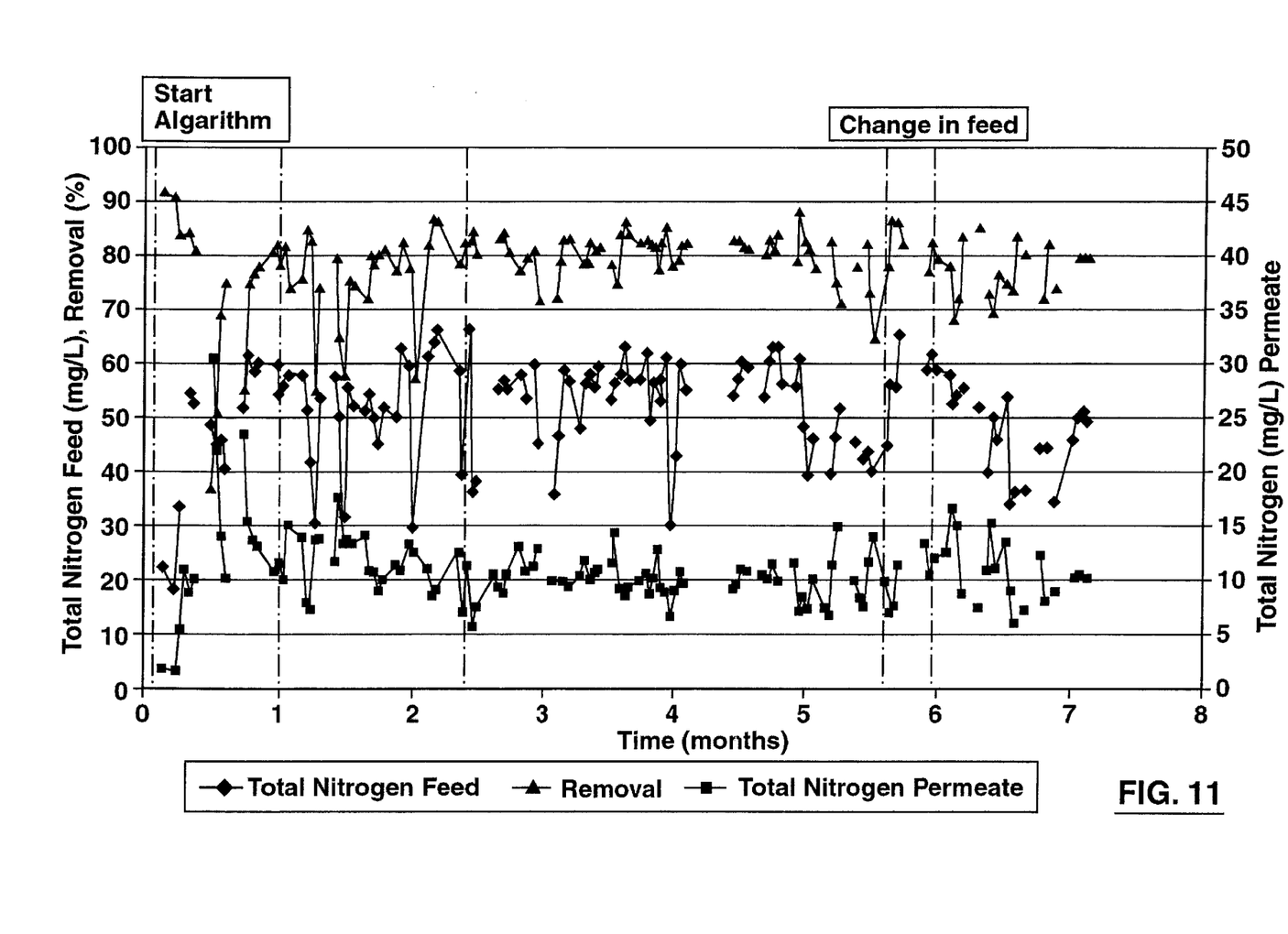

FIGS. 9, 10 and 11 show the amounts of COD, $NH_4$, $NO_3$ and Total Nitrogen in the feed water and permeate over the duration of the test. Average COD removal was 96% resulting in daily averages of between 5 and 21 mg/L in the treated permeate. Total Nitrogen removal averaged 78% resulting in daily averages of about 10 mg/L in the treated permeate. Ammonia removal averaged 96%.

As shown in the FIG. 8, the oxygenating bubble supply was off for more than one half of the time while the reactor was in operation. DO measured at a signal DO sensor infrequently exceeded 0.5 mg/L and only rarely exceeded 2.0 mg/L. Nevertheless, the results of FIGS. 9, 10 and 11 suggest that substantial rates of nitrification and COD digestion were achieved. According, the inventors believe that, despite mixing forces, aerobic areas likely exist in the tank for substantial periods of time, including periods of time when a point reading suggests that the tank is anoxic.

It is to be understood that what has been described are preferred embodiments to the invention. The invention nonetheless is susceptible to certain changes and alternative embodiments fully comprehended by the spirit of the invention as described above, and the scope of the claims below.

We claim:
1. A membrane bioreactor (10) having:
(a) a tank (12) containing mixed liquor (15);
(b) filtering membranes (22) immersed in the mixed liquor (15) and having permeate sides (20) in fluid communication with the mixed liquor (15) only through the membranes;
(c) a source of suction (23) on the permeate side (20) of the membranes (22) to withdraw filtered permeate (26) through the membranes (22); and,
(d) a scouring bubble supply (30) to provide scouring bubbles (32) below the membranes to inhibit fouling of the membranes,
characterized by
(i) an oxygenating bubble supply (47) operable to intermittently provide bubbles (50) containing oxygen in the mixed liquor (15) wherein the mixed liquor 15 is converted from an anoxic or anaerobic condition to an aerobic condition;
(ii) a sensor (60) to provide a signal indicating the level of oxygen reduction potential or dissolved oxygen concentration of the mixed liquor (15); and,
(iii) a programable logic controller (62) operable to receive the signal from the sensor (60) and programmed to turn the oxygenating bubble supply (47) on and off repeatedly so as to alternately create primarily anoxic and primarily aerobic conditions in a selected portion of the mixed liquor (15) and to consider the signal from the sensor in determining when to turn the oxygenating bubble supply (47) both on and off.

2. The bioreactor of claim 1 wherein the programable logic controller (62) is programmed to (A) turn the oxygenating bubble supply (47) on for a first variable period of time between a selected maximum time and minimum time, as long as he oxygen reduction potential or related parameter of the mixed liquor (15) stays below a preselected upper limit, and (B) leaves the oxygenating bubble supply (47) off for a second variable period of time between a selected second maximum time and second minimum time, as long as the oxygen reduction potential or related parameter of the mixed liquor (15) stays above a preselected lower limit, the first variable period of time and the second variable period of time each beginning at the end of the other.

3. The bioreactor of claim 2 wherein the maximum time, minimum time, second maximum time and second minimum time are chosen to provide periods of alternating nitrification and denitrifcation of the mixed liquor (15).

4. The bioreactor of claim 3 wherein the upper level of oxygen reduction potential of the mixed liquor (15) is between 200 and 250 mV or a corresponding value of the related parameter and the lower level of oxygen reduction potential of the mixed liquor (15) or the related parameter corresponds with substantially anaerobic conditions.

5. A process for treating waste water (13) in a membrane bioreactor (10) having the steps of:
(a) feeding the waste water (13) into a tank (12) in which biological processes convert the waste water (13) into a mixed liquor (15);
(b) providing filtering membranes (22) immersed in the mixed liquor (15) such that the permeate sides (20) of the filtering membranes are in fluid communication with the mixed liquor (15) only through the membranes (22);
(c) applying suction to the permeate side (20) of the membranes (22) to withdraw filtered permeate (36) substantially continuously; and, (d) providing scouring bubbles (32) below the membranes (22) throughout permeation to inhibit fouling of the membranes (22), characterized by, (i) creating anoxic conditions in a substantial part of the mixed liquor (15) while only scouring bubbles (32) are provided; and, (ii) intermittently providing aerating bubbles (50) in the mixed liquor (15) for a period of time star are anoxic or anaerobic conditions, in the substantial part of the mixed liquor and chosen considering sensed levels of oxygen reduction potential or dissolved oxygen concentration of the mixed liquor, intermittently create aerobic conditions in a second substantial part of the mixed liquor (15) so as to facilitate nitrification and denitrification of the mixed liquor.

6. The process of claim 5 further comprising:

(a) producing a signal indicating the level of oxygen reduction potential or dissolved oxygen concentration of the mixed liquor (15);

(b) providing aerating bubbles (50) for a first variable period of time between a selected maximum time and minimum time, as long as the oxygen reduction potential or related parameter of the mixed liquor (15) stays below a preselected upper limit;

(c) not providing aerating bubbles (50) for a second variable period of time between a selected second maximum time and second minimum time, as long as the oxygen reduction potential or dissolved oxygen concentration of the mixed liquor (15) stays above a preselected lower limit; and, (d) wherein the first variable period of time and the second variable period of time each begin at the end of the other.

7. The process of claim 6 wherein the upper level of oxygen reduction potential of the mixed liquor (15) is between 200 and 250 mV or a corresponding value of the related parameter and the lower level of oxygen reduction potential of the mixed liquor (15) or the related parameter corresponds with substantially anaerobic conditions.

8. The process of claim 5 wherein the bioreactor (10) is operated at a concentration of MLVSS ranging from 10 g/L to 30 g/L.

9. The process of claim 5 wherein the bioreactor (10) is operated at an organic loading of feed between 0.3 kilograms of 5 day BOD per cubic meter per day and 3.0 kilograms of 5 day BOD per cubic meter per day.

10. The process of claim 5 wherein the bioreactor (10) has a hydraulic retention time between 1.5 hours and 6 hours.

11. The process of claim 5 wherein the bioreactor (10) has a minimum mean cell residence time of 7 days and maximum mean cell residence time of 100 days.

12. The process of claim 11 wherein the bioreactor (10) has a mean cell residence time between 10 days and 30 days.

13. The process of claim 5 wherein the waste water (13) is fed into the tank directly over the membranes.

* * * * *